US012705782B2

(12) United States Patent
Jeon et al.

(10) Patent No.: US 12,705,782 B2
(45) Date of Patent: Aug. 11, 2026

(54) POSITIONING METHOD BASED ON ARTIFICIAL INTELLIGENCE NEURAL NETWORK CONSTRUCTED ON BASIS OF SENSOR MAP IMAGE OF MULTI-SIGNAL ENVIRONMENT DATA, AND DEVICE THEREFOR

(71) Applicant: PAPAYA CORPORATION, Anyang-si (KR)

(72) Inventors: Young Jun Jeon, Yongin-si (KR); Tae Yeab Kim, Seongnam-si (KR); Min Joon Jeon, Yongin-si (KR); Ki Ryang Kwon, Seongnam-si (KR)

(73) Assignee: PAPAYA CORPORATION, Anyang-si (KR)

( * ) Notice: Subject to any disclaimer, the term of this patent is extended or adjusted under 35 U.S.C. 154(b) by 292 days.

(21) Appl. No.: 18/556,640

(22) PCT Filed: Jan. 20, 2023

(86) PCT No.: PCT/KR2023/001076

§ 371 (c)(1),
(2) Date: Oct. 20, 2023

(87) PCT Pub. No.: WO2023/140711

PCT Pub. Date: Jul. 27, 2023

(65) Prior Publication Data

US 2024/0371025 A1 Nov. 7, 2024

(30) Foreign Application Priority Data

Jan. 24, 2022 (KR) ........................ 10-2022-0009695
Jan. 24, 2022 (KR) ........................ 10-2022-0009696

(51) Int. Cl.
*G06K 9/00* (2022.01)
*G06T 7/70* (2017.01)

(52) U.S. Cl.
CPC ...... *G06T 7/70* (2017.01); *G06T 2207/10024* (2013.01); *G06T 2207/20081* (2013.01); *G06T 2207/20084* (2013.01)

(58) Field of Classification Search
CPC .......... G01C 21/20; G01C 25/00; G01C 5/06; G01S 5/02; G01W 1/02; G06N 3/08;
(Continued)

(56) References Cited

U.S. PATENT DOCUMENTS

2013/0026224 A1* 1/2013 Ganick ................ G01C 21/206
235/375
2015/0149133 A1* 5/2015 Do ........................ G01S 5/0278
703/6

(Continued)

FOREIGN PATENT DOCUMENTS

KR 10-2017-0040652 A 4/2017
KR 10-2017-0078116 A 7/2017

(Continued)

OTHER PUBLICATIONS

International Search Report & Written Opinion for PCT/KR2023/001076 by Korean Intellectual Property Office dated May 4, 2023.

(Continued)

*Primary Examiner* — Hadi Akhavannik
(74) *Attorney, Agent, or Firm* — BROADVIEW IP LAW, PC

(57) ABSTRACT

A method for operating a positioning system, according to an embodiment of the present invention, comprises a step of constructing a positioning model based on artificial intelligence position neural network learning, on the basis of respective sensor map images converted from multi-signal environment data collected by a plurality of portable terminals and position information corresponding to the plurality of portable terminals, wherein the positioning model based on artificial intelligence position neural network learning is trained to output first position estimation information corresponding to a first portable terminal when a first sensor map image corresponding to the first portable terminal, for which a positioning based service is requested, is input.

18 Claims, 12 Drawing Sheets

(58) Field of Classification Search
CPC . G06T 2207/10024; G06T 2207/20081; G06T 2207/20084; G06T 7/70; G06V 10/74; G06V 10/82; Y04S 10/50
See application file for complete search history.

(56) References Cited

U.S. PATENT DOCUMENTS

| | | | | |
|---|---|---|---|---|
| 2015/0192656 | A1* | 7/2015 | Werner | G01S 3/46<br>342/442 |
| 2017/0332203 | A1* | 11/2017 | Nagpal | H04W 4/029 |
| 2018/0048998 | A1* | 2/2018 | Mahajan | H04W 4/025 |
| 2018/0067186 | A1* | 3/2018 | Elias | G01S 5/0263 |
| 2018/0176728 | A1* | 6/2018 | Fraccaroli | H04W 4/021 |
| 2018/0330541 | A1* | 11/2018 | Owechko | G06T 17/05 |
| 2019/0250283 | A1* | 8/2019 | Larnaout | G06T 17/05 |
| 2019/0251352 | A1* | 8/2019 | Hovden | G06T 3/40 |
| 2021/0341561 | A1 | 11/2021 | Huang et al. | |

FOREIGN PATENT DOCUMENTS

| | | |
|---|---|---|
| KR | 10-2019-0107692 A | 9/2019 |
| KR | 10-2021-0048697 A | 5/2021 |

OTHER PUBLICATIONS

Office Action for KR 10-2023-0009051 by Korean Intellectual Property Office dated Sep. 18, 2023.

* cited by examiner

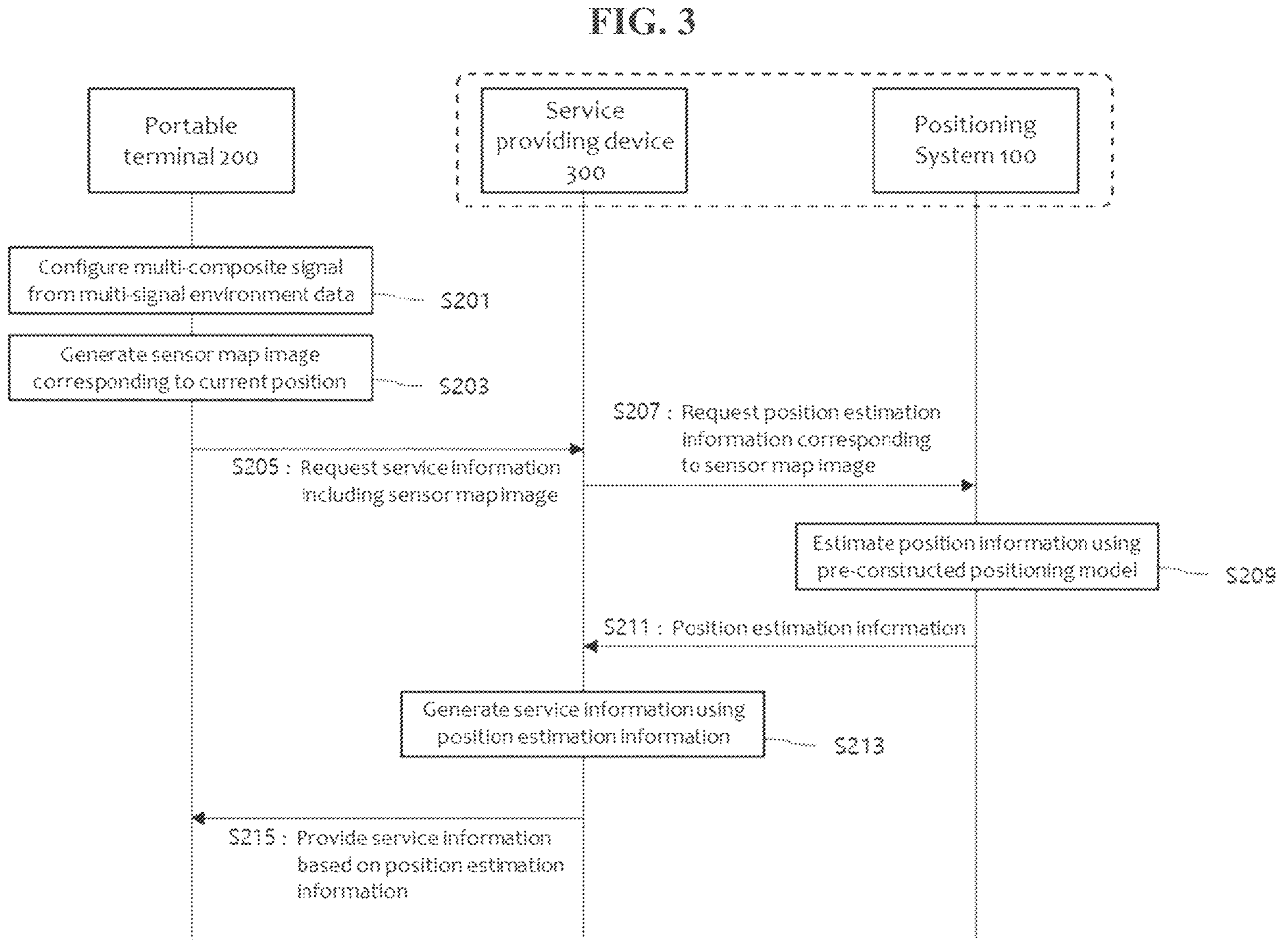
FIG. 3
Portable terminal 200
Service providing device 300
Positioning System 100
Configure multi-composite signal from multi-signal environment data
S201
Generate sensor map image corresponding to current position
S203
S205 : Request service information including sensor map image
S207 : Request position estimation information corresponding to sensor map image
Estimate position information using pre-constructed positioning model
S209
S211 : Position estimation information
Generate service information using position estimation information
S213
S215 : Provide service information based on position estimation information

Relative atmospheric pressure map generator 151 pressure difference

[floor index]

[floor index]

collected pressure pair relative pressure map (diffmap)

Figure 10:
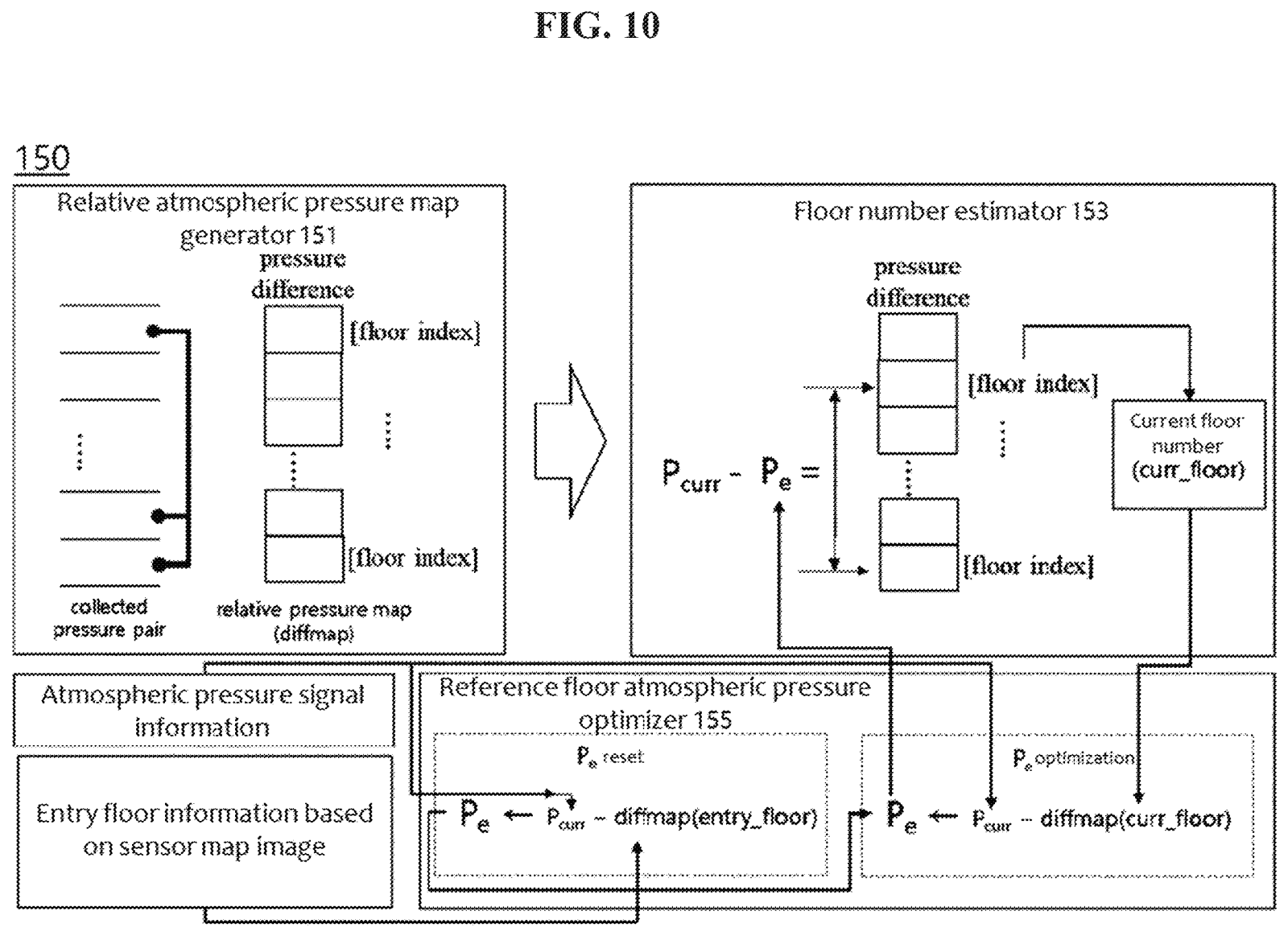

Floor number estimator 153

$P_{curr} - P_e =$ pressure difference

[floor index]

[floor index]

Current floor number (curr_floor)

Atmospheric pressure signal information

Entry floor information based on sensor map image

Reference floor atmospheric pressure optimizer 155

$P_{e}$ reset $P_e \leftarrow P_{curr} - \text{diffmap(entry\_floor)}$ $P_{e}$ optimization $P_e \leftarrow P_{curr} - \text{diffmap(curr\_floor)}$

POSITIONING METHOD BASED ON ARTIFICIAL INTELLIGENCE NEURAL NETWORK CONSTRUCTED ON BASIS OF SENSOR MAP IMAGE OF MULTI-SIGNAL ENVIRONMENT DATA, AND DEVICE THEREFOR

CROSS-REFERENCE TO RELATED APPLICATIONS

This application is a National Phase Entry Application of PCT Application No. PCT/KR2023/001076, filed on Jan. 20, 2023, which claims priority to Korean Patent Application No. KR 10-2022-0009695, filed on Jan. 24, 2022, which claims priority to Korean Patent Application No. KR 10-2022-0009696, filed on Jan. 24, 2022, in Korean Intellectual Property Office, the entire contents of which are hereby incorporated by reference in its entirety.

TECHNICAL FIELD

The present invention relates to a positioning system. More specifically, the present invention relates to positioning method based on an artificial intelligence neural network constructed on the basis of a sensor map image of multi-signal environment data, and a device thereof.

BACKGROUND ART

Recently, as Global Positioning System (GPS) has begun to be mounted on most smartphones, position-based services have begun to be used in various areas in real life. In particular, as GPS can be used freely in various applications (APPs) of smartphones, position information is combined with various services.

However, as signals generated by GPS satellites become very weak while passing through the atmosphere more than 20,000 km, the signals may not penetrate into a building. Therefore, position-based services such as a road guidance (navigation) service or the like cannot be used indoors. This is since that most position-based services depend on GPS.

To solve this problem, various indoor positioning methods have been proposed. The indoor positioning techniques known so far include a method of positioning an indoor position using only information on wireless base stations and wireless LAN (Wi-Fi) APs collected for indoor positioning, a method of continuously positioning indoor and outdoor positions using GPS, base station, Wi-Fi, and magnetic field information, and the like.

In addition, data collection for indoor positioning includes, for example, fingerprinting methods such as collecting data by concerned persons, or collecting information on wireless LAN (Wi-Fi) AP signals and manufacturing a map using related software.

However, accuracy of the indoor positioning technique is still insufficient even at the present time when time spent for activities in indoor spaces is rapidly increasing in accordance with increase of buildings that grow in size.

Particularly, constructing and maintaining a map by collecting indoor signals requires high cost since accurate drawings of buildings and skilled experts are required, and since accuracy of position has an error of several tens of meters although wireless signals are measured by triangulation, it is insufficient to be used in practice.

Furthermore, since the positioning technique using geomagnetic fields is poor in versatility, has no uniqueness corresponding to a position, and allows positioning only in a predetermined path, there is a problem in that all the maps should be reconstructed when part of the magnetic field is changed.

For this reason, there is a problem in that the technique is difficult to apply in a special environment such as a temporarily constructed space, tunnel, parking lot, exhibition hall, or the like.

DISCLOSURE OF INVENTION

Technical Problem

Therefore, the present invention has been made in view of the above problems, and it is an object of the present invention to provide a positioning system, which can be applied in various environments while accurately positioning outdoor and indoor coordinates at a low cost by collecting multi-signal environment data collected by a general portable terminal and configuring a multi-composite signal and using a positioning network based on an artificial intelligence neural network constructed from sensor map images of the multi-composite signal.

Technical Solution

To accomplish the above object, according to one aspect of the present invention, there is provided a method of operating a positioning system, the method comprising the step of: constructing a positioning model based on artificial intelligence positioning neural network learning on the basis of each sensor map image converted from multi-signal environment data collected by a plurality of portable terminals and position information corresponding to the plurality of portable terminals, wherein when a first sensor map image corresponding to a first portable terminal for which a positioning-based service is requested is input, the positioning model based on artificial intelligence positioning neural network learning is trained to output first position estimation information corresponding to the first portable terminal.

According to another aspect of the present invention, there is provided a positioning system comprising: a sensor map image collection unit for collecting each sensor map image converted from multi-signal environment data collected by a plurality of portable terminals; and a positioning neural network learning unit for constructing a positioning model based on artificial intelligence positioning neural network learning on the basis of position information corresponding to the plurality of portable terminals, wherein when a first sensor map image corresponding to a first portable terminal for which a positioning-based service is requested is input, the positioning model based on artificial intelligence positioning neural network learning is trained to output first position estimation information corresponding to the first portable terminal.

Advantageous Effects

According to an embodiment of the present invention, an indoor coordinate positioning model based on an artificial intelligence neural network can be constructed, which configures a composite signal from multi-environment signals sensed by a portable terminal in correspondence to position information, converts the composite signal into a sensor map image, and outputs positioning information based on learning of the sensor map image, and a learning model-based indoor positioning service based thereon may be provided.

Therefore, according to an embodiment of the present invention, there is provided a positioning system that can be applied in various environments while accurately positioning outdoor and indoor coordinates at a low cost by collecting various signals collected from a general portable terminal as a multi-composite signal and using an artificial intelligence neural network-based positioning network constructed based on big data of the multi-composite signal.

BRIEF DESCRIPTION OF THE DRAWINGS

FIG. 3 is a ladder diagram for explaining a process of providing service information based on a sensor map image according to an embodiment of the present invention.

FIG. 10 is a block diagram showing in more detail a relative pressure map model-based floor number positioning unit according to an embodiment of the present invention.

BEST MODE FOR CARRYING OUT THE INVENTION

Figure 1:
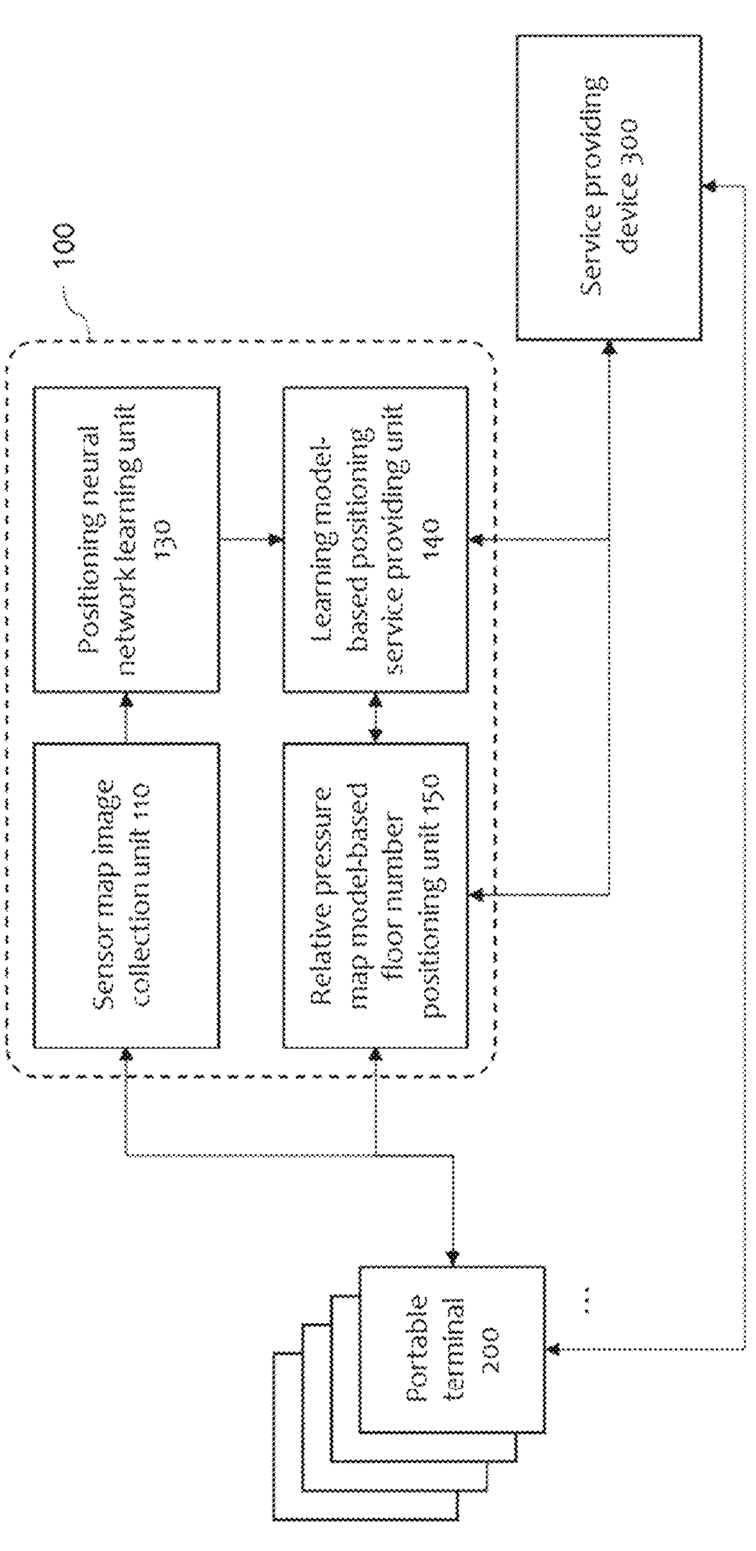
FIG. 1 is a view schematically showing a system according to an embodiment of the present invention.

Hereinafter, only the principles of the present invention will be exemplified. Therefore, although not clearly described or shown in this specification, those skilled in the art will be able to implement the principles of the present invention and invent various devices included in the spirit and scope of the present invention. In addition, it should be understood that all conditional terms and embodiments listed in this specification are, in principle, clearly intended only for the purpose of understanding the concept of present invention, and not limited to the embodiments and states specially listed as such.

In addition, it should be understood that all detailed descriptions listing specific embodiments, as well as the principles, aspects, and embodiments of the present invention, are intended to include structural and functional equivalents of such matters. In addition, it should be understood that such equivalents include equivalents that will be developed in the future, as well as currently known equivalents, i.e., all devices invented to perform the same function regardless of the structure.

Accordingly, for example, the block diagrams in the specification should be understood as expressing the conceptual viewpoints of illustrative circuits that embody the principles of the present invention. Similarly, all flowcharts, state transition diagrams, pseudo code, and the like may be practically embodied on computer-readable media, and it should be understood that regardless of whether or not a computer or processor is explicitly shown, they show various processes performed by the computer or processor.

Functions of various elements shown in the drawings including functional blocks displayed as processors or similar concepts may be provided using hardware capable of executing software in relation to appropriate software, as well as dedicated hardware. When provided by a processor, the functions may be provided by a single dedicated processor, a single shared processor, or a plurality of separate processors, some of these may be shared.

In addition, explicit use of the terms presented as processors, controls, or concepts similar thereto should not be interpreted by exclusively quoting hardware having an ability of executing software, and should be understood to implicitly include, without limitation, digital signal processor (DSP) hardware, and ROM, RAM and non-volatile memory for storing software. Other known common hardware may also be included.

Components expressed in the claims of this specification as means for performing the functions described in the detailed description are intended to include all methods performing the function including, for example, a combination of circuit elements performing the functions or all types of software including firmware/microcode or the like, and combined with suitable circuits for executing the software to perform the functions. Since the present invention defined by these claims is combined with the functions provided by variously arranged means and combined with methods required by the claims, any means capable of providing these functions should be understood as being equivalent to those grasped from this specification.

The above objects, features and advantages will become more apparent through the following detailed description related to the accompanying drawings, and accordingly, those skilled in the art may easily implement the technical spirit of the present invention. In addition, when it is determined in describing the present invention that the detailed description of a known technique related to the present invention may unnecessarily obscure the gist of the present invention, the detailed description thereof will be omitted.

Hereinafter, a preferred embodiment according to the present invention will be described in detail with reference to the accompanying drawings.

FIG. 1 is a conceptual view schematically showing the entire system according to an embodiment of the present invention.

The entire system according to an embodiment of the present invention includes a portable terminal 200, a positioning system 100, and a service providing device 300.

The positioning system 100 may be connected to the portable terminal 200 and the service providing device 300 through a wired/wireless network and perform communication with them to provide a positioning service according to an embodiment of the present invention.

Here, each of the networks may be implemented as any one type of wired/wireless networks, such as a local area network (LAN), a wide area network (WAN), a value-added network (VAN), a personal area network (PAN), a mobile communication network, or a satellite communication network.

In addition, the portable terminal 200 may be any one individual device among a cellular phone, a smartphone, a smart pad, and a Personal Digital Assistant (PDA), and may configure various sensor information collected from multi-signal environment data environment into a multi-signal for indoor and outdoor positioning, and transmit the configured multi-signal to the positioning system 100 together with position mapping information to be processed to construct a positioning neural network learning model based on sensor map images.

In addition, barometer signals among the multi-signal may be configured as a separate signal and transmitted to the relative pressure map model-based floor number positioning unit 150 of the positioning system 100.

In addition, the portable terminal 200 may configure a sensor map image based on the multi-signal and request service information based on position information corresponding to the sensor map image from the service providing device 300. In this case, the service providing device 300 may acquire position estimation information of a positioning neural network learning model based on the sensor map image using the positioning system 100, configure service information based on the position information using the acquired position estimation information, and provide the service information to the portable terminal 200.

In an embodiment of the present invention, as the multi-signal may be collected from wireless signals of various surrounding environments and may include at least one among a Wi-Fi signal, a Bluetooth signal, a GPS/GLONASS signal, a mobile network signal, a geomagnetic sensor signal, an acceleration sensor signal, and a barometer signal, the multi-signal may be configured by aggregating signals of various environment sensors generally provided in the portable terminal 200 into a matrix and performing preprocessing such as normalization or the like.

In addition, the positioning system 100 may construct a positioning model based on an artificial intelligence neural network through associative learning of sensor map images corresponding to the multi-signal of the portable terminal 200 and position mapping information, and output position estimation information for the sensor map image requested thereafter using the constructed positioning model based on an artificial intelligence neural network. Here, as the position estimation information may include at least one among two-dimensional positioning estimation information corresponding to indoor or outdoor coordinates and vertical positioning estimation information estimated based on a relative pressure map model, three-dimensional position information may be estimated based on the two-dimensional and vertical positioning estimations.

In addition, the service providing device 300 may provide various positioning-based data services to the portable terminal 200 using the positioning estimation information of the positioning system 100. In addition, the service providing device 300 may include a service providing unit (not shown) for providing these services, and the service providing unit may be configured of one or more processors that process a service providing process.

More specifically, referring to FIG. 1, the positioning system 100 according to an embodiment of the present invention includes a sensor map image collection unit 110, a positioning neural network learning unit 130, a relative pressure map model-based floor number positioning unit 150, and a learning model-based positioning service providing unit 140.

First, the sensor map image collection unit 110 collects multi-signals sensed by the portable terminal 200 and sensor map image data configured in correspondence to position information.

Here, the multi-signal may be configured of composite position information configured by converting all sensor signals that can be received from a smartphone or the like into <KEY, VALUE> pairs, and each sensor signal may include a normalized sensor signal according to preprocessing without regard to a terminal type such as a smartphone.

The multi-signal may include a radio wave signal and a sensor module data signal collected by the portable terminal 200, and may include, for example, radio signals such as Wi-Fi broadcast signals, Bluetooth advertisement signals, base station signals of a mobile network, GPS RAW data signals, and the like, and sensor module data signals of accelerometers, magnetic field sensors, direction sensors, barometers, and the like.

In addition, the sensor map image collection unit 110 collects sensor map image data configured from the preprocessed multi-signal. Here, the sensor map image collection unit 110 may construct by itself a sensor map image for the multi-signal received from the portable terminal 200, or receive a sensor map image corresponding to the multi-signal generated and transmitted by the portable terminal 200.

Here, the sensor map image is data obtained by processing a composite signal configured using the multi-signal into an image, and may include image data representing the multi-signal collected at a specific position at a specific time point as a single image. Here, the sensor map image is image information of the multi-signal configured in correspondence to positioning information, and includes a composite pixel position and color information of each pixel, and the sensor map image may be collected to be mapped together with the position information, user ID, device ID, timestamp, and system position information. The sensor map image collection unit 110 manages the sensor map image as unique characteristic information indicating one position, and this may be configured as a fingerprint information database.

Accordingly, the positioning neural network learning unit 130 constructs an indoor coordinate positioning model based on an artificial intelligence neural network, which learns the relationship between the sensor map image and the position information for positioning, and outputs positioning information based on the similarity between the sensor map images. Here, although a known neural network learning method such as CNN, DNN, RNN, LSTM or the like may be used as the artificial intelligence neural network, preferably, the Positioning Neural Network (PNN) model proposed in the present invention may be used.

In addition, using the positioning model based on an artificial intelligence neural network, the learning model-based positioning service providing unit 140 provides indoor positioning information according to a request of the service providing device 300.

More specifically, the sensor map image may be configured to include constellation image objects of different color sizes and concentrations (or intensities) according to the type, number, and intensity of the multi-signal. Here, the constellation image object according to an embodiment of the present invention is a feature object of a sensor map image, and may mean an image object having a size or an intensity of a predetermined level or higher in an image frame, and coordinate information corresponding to the constellation image object may be specified.

As the constellation image object is configured, the normalized multi-signal may be converted into one constellation image object according to the type, and a set of constellation image objects may function as a signal map representing collected positions. In addition, the sensor map image including the constellation image objects may be converted into big data to be effectively used in constructing an artificial intelligence neural network.

In addition, the positioning neural network learning unit 130 may construct a deep learning-based Positioning Neural Network (PNN) model of the constellation image object, which multi-dimensionally learns the positioning estimation information using a multi-dimensional activation function for comparing similarity between the constellation image objects.

The positioning neural network model according to an embodiment of the present invention may be a perceptron neural network specialized for comparison of constellation images, and may be configured to have perceptron corresponding to all stars (image object pixels) of each image.

In addition, the constellation image may be an image that connects signal pixels mapped to the same position information, and an accelerated learning process may be performed by optimizing the perceptron learning and comparison process based thereon.

Furthermore, the positioning neural network learning unit 130 constructs a neural network by applying a three-dimensional or multi-dimensional activation function corresponding to two inputs, and optimizes a discrete function to configure more accurate positioning information.

For example, as a distance based on similarity may be calculated closer as two constellation images are more similar, and the distance based on similarity may be calculated farther as the shapes of the constellation images are more different, when learning is performed to estimate previously mapped position information with a neural network constructed using the similarity information, a positioning service specialized to be capable of positioning even in various special environments may be provided.

In addition, the service providing device 300 may provide various service information based on indoor positioning information to the portable terminal 200 in response to a request of the portable terminal 200.

For example, the portable terminal 200 may transmit an urban information service request using a sensor map image collected at the current time point to the service providing device 300, and the service providing device 300 may acquire position estimation information corresponding to the sensor map image from the positioning system 100 and provide service information configured using the acquired position estimation information to the portable terminal 200.

This service may particularly include, for example, position guidance in a building, positioning guidance in a poor signal-reception environment such as an underground facility space or the like, precise position guidance service, urban position information service, facility safety management service associated with various types of CCTVs, user emergency rescue service, and the like.

According to construction of such a system, the positioning system 100 according to an embodiment of the present invention may construct positioning models suitable for various buildings and special environments and has an advantage of reducing construction cost and time.

Meanwhile, the relative pressure map model-based floor number positioning unit 150 according to an embodiment of the present invention may acquire a barometer signal sensed by the portable terminal 200 among the multi-signal, process floor number positioning based on a barometer signal learning model, and transfer the result to the learning model-based positioning service providing unit 140.

Accordingly, the learning model-based positioning service providing unit 140 may measure current floor number information by applying the current pressure signal of the portable terminal 200 to the relative pressure map model constructed by the relative pressure map model-based floor number positioning unit 150.

Accordingly, the service providing device 300 may acquire vertical positioning information using the current floor number information and further perform a position information service process based on the vertical positioning information.

More specifically, as the relative pressure map model-based floor number positioning unit 150 may include a relative pressure map generator for generating a relative pressure map on the basis of a relative pressure pair, and a floor number estimator for positioning the current floor number information by applying the pressure signal and the entry floor information of the portable terminal to the relative pressure map, more precise floor number estimation is possible.

Furthermore, as the relative pressure map model-based floor number positioning unit 150 may update pressure information of a reference floor (e.g., first floor) of the relative pressure map using the current floor number information and the pressure signal, and perform correction of error in the relative pressure map in real time using weather information received from the outside, floor number positioning is possible based on an accurate relative pressure map updated in real time. This will be described below in more detail.

Figure 2:
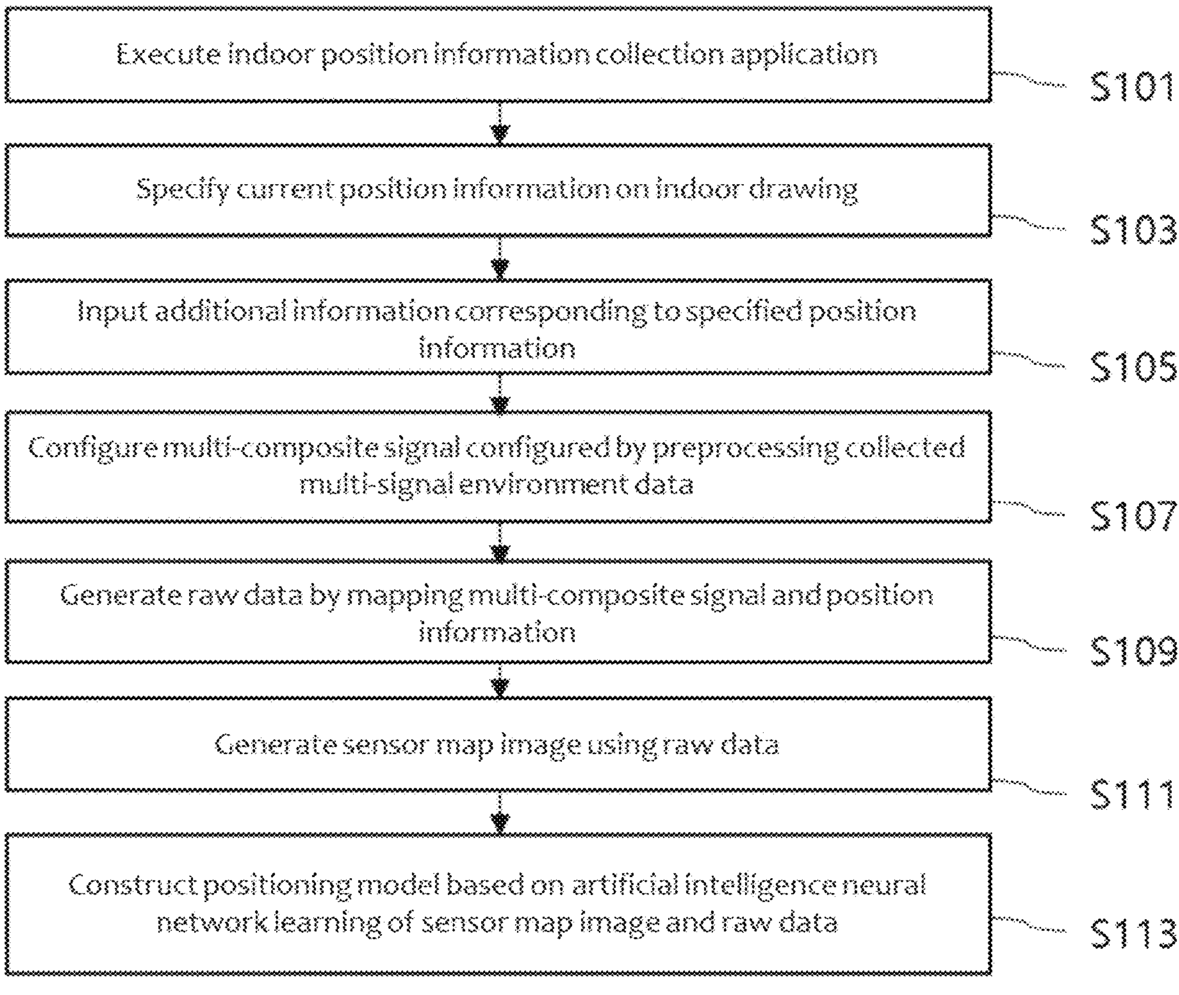
FIG. 2 is a flowchart illustrating a positioning model construction process according to an embodiment of the present invention.

FIG. 2 is a flowchart illustrating a positioning model construction process according to an embodiment of the present invention.

Referring to FIG. 2, first, the portable terminal 200 executes an indoor position information collection application (S101).

Then, the portable terminal 200 acquires a specification signal specifying current position information on an indoor drawing (S103).

In addition, the portable terminal 200 may receive additional information corresponding to the specified position information (S105).

Thereafter, the portable terminal 200 configures a multi-composite signal by preprocessing multi-signal environment data collected in correspondence to the position information (S107).

Then, the portable terminal 200 generates raw data by mapping the multi-composite signal and the position information (S109), and configures a sensor map image using the generated raw data (S111).

Here, step S111 may be processed by the positioning system 100 that collects the multi-composite signal and the position information from the portable terminal 200.

In addition, the sensor map image and the raw data configured as described above are used to construct a positioning model based on artificial intelligence neural network learning in the positioning system 100 (S113).

FIG. 3 is a ladder diagram for explaining a process of providing service information based on a sensor map image according to an embodiment of the present invention.

Referring to FIG. 3, in an embodiment of the present invention, the positioning system 100 and the service providing device 300 are constructed as one service providing system and may provide an urban information service to the portable terminal 200. Accordingly, each component of the positioning system 100 may be included as an element of the service providing device 300 according to execution of a service process.

Referring to FIG. 3, the portable terminal 200 according to an embodiment of the present invention first configures a multi-composite signal from multi-signal environment data (S201).

In the embodiment of FIG. 3, the portable terminal 200 is a separate terminal that receives an actual urban information service after the learning model in FIG. 2 is constructed, and may also be referred to as a specific first portable terminal.

Thereafter, the portable terminal 200 generates a sensor map image corresponding to the current position (S203).

Then, the portable terminal 200 transmits a request for service information including the sensor map image to the service providing device 300 (S205).

Thereafter, the service providing device 300 requests position estimation information corresponding to the sensor map image from the positioning system 100 (S207).

The positioning system 100 estimates position information using a previously constructed positioning neural network learning model (S209), and transfers the estimated position estimation information to the service providing device 300 (S211).

Here, the position estimation information may include two-dimensional position coordinate information as two-dimensional horizontal position information, and may include vertical coordinate information or information on the floor number of the building as vertical position information.

Then, the service providing device 300 generates service information using the position estimation information (S213) and provides the generated service information to the portable terminal 200 (S215).

Figure 4:
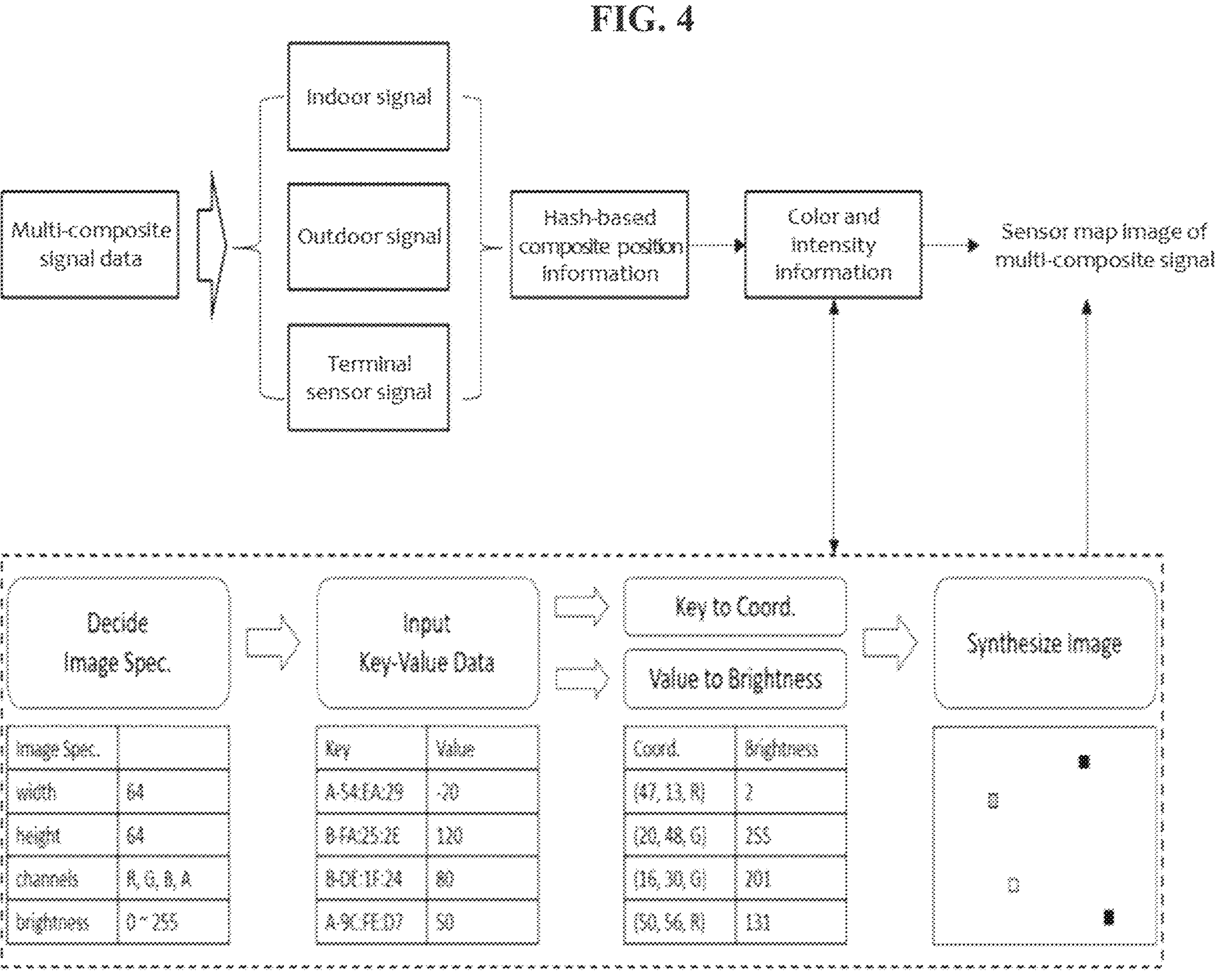
FIGS. 4 and 5 are views for explaining in more detail a process of constructing a positioning neural network based on sensor map images according to an embodiment of the present invention.
Figure 5:
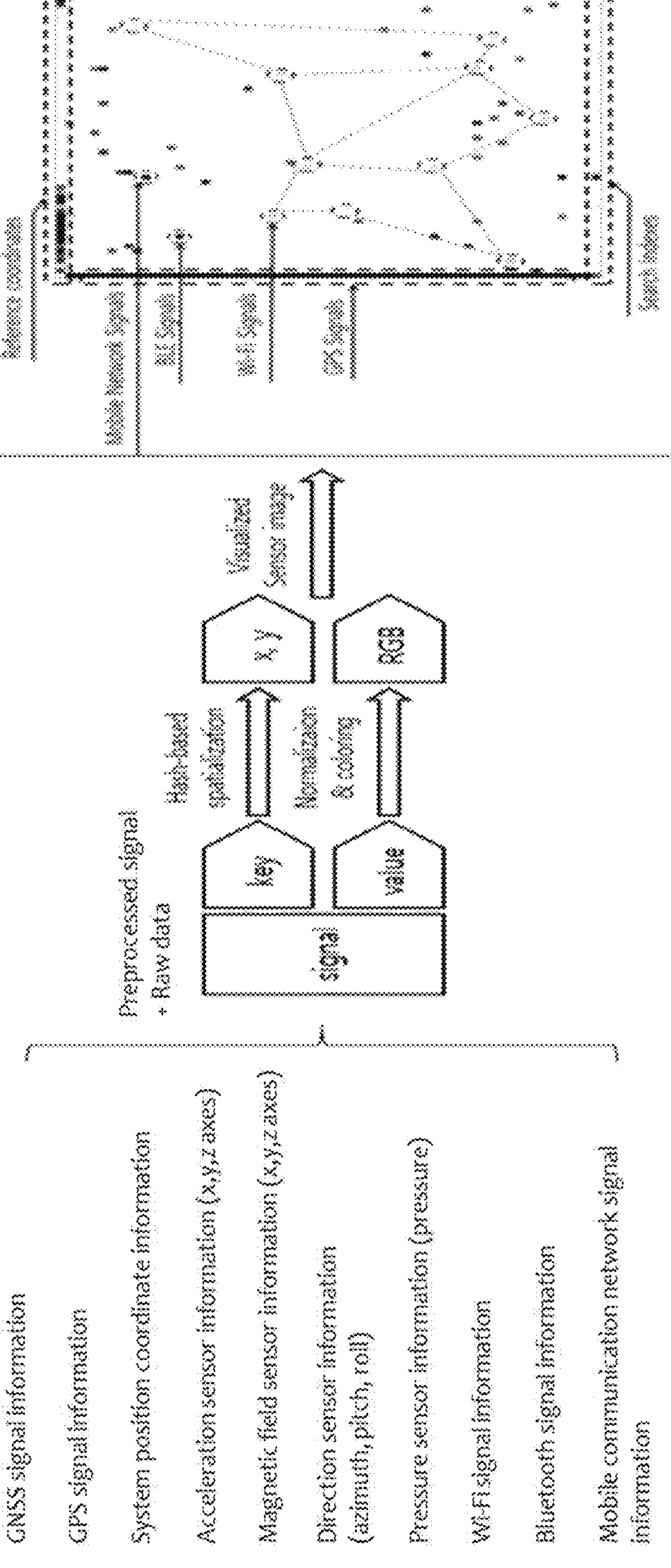

FIGS. 4 and 5 are views for explaining in more detail a process of constructing a positioning neural network based on sensor map images according to an embodiment of the present invention.

First, referring to FIG. 4, the multi-signal may be classified into an indoor signal, an outdoor signal, and a terminal sensor signal that can be collected by the portable terminal 200 from multi-signal environment data. The classified signals may be configured as composite position information preprocessed on the basis of individual hash processing, and when color and intensity information corresponding to the composite position information is determined, a sensor map image of the multi-composite signal may be configured.

More specifically, as shown in the low portion of FIG. 4, 64 horizontal pixels, 64 vertical pixels, a color channel (R, G, B, A), and a brightness value (0 to 255) may be set as the specifications of the sensor map image.

In addition, the values obtained by hashing the multi-composite signal collected from the multi-signal environment data may be expressed as values of KEY such as A-54:EA:29, B-FA:25:2E, B-DE:1F:24, A-9C:FE:D7, and the like, and as values of VALUE such as −20, 120, 80, and 50 are respectively assigned as intensities of the multi-composite signal, KEY-VALUE data may be configured as hash-based composite position information.

In addition, in correspondence to the hash-based composite position information, a key-to-coordinate conversion process may be performed to convert the values of KEY into color channel information based on position information, and a value-to-brightness conversion process may be performed to convert the values of intensity into brightness information.

When the conversion process is performed in this way, the values of KEY hashed before are pixels constituting the sensor map image and may be converted into (horizontal position, vertical position, color channel), and may be converted into coordinate conversion variables such as (47,13, R), (20,48,G), (16,30,G), and (50,56,R). Each coordinate conversion variable may indicate a horizontal pixel position, a vertical pixel position, and color channel information (R, G, B, or A) in the sensor map image.

In addition, each brightness information may be mapped to the coordinate conversion variable described above, and brightness variables such as 2,255,201, and 131 may be specified in the four cases described above.

Accordingly, the positioning system 100 may configure one sensor map image frame corresponding to the multi-composite signal using the coordinate conversion variables and the brightness information, and the configured sensor map image may represent the features of the multi-composite signal corresponding to specific position coordinates.

In addition, referring to FIG. 5, a sensor map image according to an embodiment of the present invention may configure a constellation image by interconnecting major signals in the form of a constellation image according to change of intensity, and according to positioning neural network (PNN) learning of the constellation image, a big data learning model for indoor positioning may be constructed more efficiently.

Particularly, FIG. 5 shows a process of configuring the multi-composite signal into a sensor map image and converting the sensor map image into a constellation image, and the multi-signal (SIGNAL) may be converted into pairs of KEY and VALUE. Then, the multi-signal is normalized by a normalization process, and KEY information is converted into X and Y coordinates and colors of constellation image object pixels by a hashing process, and the VALUE is determined as intensity to indicate a value converted into a concentration (or intensity) of an object.

In addition, referring to FIG. 5, for example, the multi-composite signal may include various element information for each signal. In the case of a radio wave signal, the Wi-Fi signal may include the number of APs, the MAC address of each AP, and receive signal strength indicator (RSSI) information, the mobile network signal may include the number of base stations, the address each base station, and RSSI information, the Bluetooth signal may include the number of Bluetooth beacons, the MAC address of each beacon, and RSSI information, and the GPS signal may include a GPS signal, a GLONASS signal, information on the entire NMEA message, information on the number of satellites, information on each satellite number corresponding to the GPS signal, and RSSI information of each satellite. In addition, in the case of the sensor module data signal, the geomagnetic sensor may include x/y/z-axis geomagnetic measurement value information, the acceleration sensor may include x/y/z-axis gravity measurement value information, and the barometer sensor may include atmospheric pressure information.

Accordingly, as shown on the right side of FIG. 5, the multi-composite signal is converted into pixel position coordinates, pixel color, and intensity information to be configured as a sensor map image configured of constellation image objects representing indoor specific position information. More specifically, each sensor and the signal type may be expressed as a color of a dot that is an image object, and the number of sensors may be expressed as the size of a dot, and the strength of a sensor may be expressed as the color depth (or intensity) of a dot. According to the constellation images, a composite signal that can be received indoors may be configured as a sensor map image, and may be constructed as a positioning neural network model that estimates indoor position information by a deep learning process.

Such a positioning neural network model may be configured by learning similarity of feature information between constellation image data of the sensor map image, and position information. For example, similarity between sensor map images of two positions may be calculated as an actual Euclidian distance using comparison of similarity between the constellation image objects.

Accordingly, a representative constellation image of each position may be configured, and when such a constellation image is used, a positioning neural network that can be used as a sensor map image positioning model may be constructed. This learning process is a configuration that is difficult to implement in a simple parameter learning method such as an existing CNN or the like, and accuracy of estimation may be improved as an image-based similarity learning process is used.

FIGS. 6 to 9 are views for explaining in more detail a general technical algorithm for constructing a positioning neural network based on sensor map images according to an embodiment of the present invention.

Figure 6:
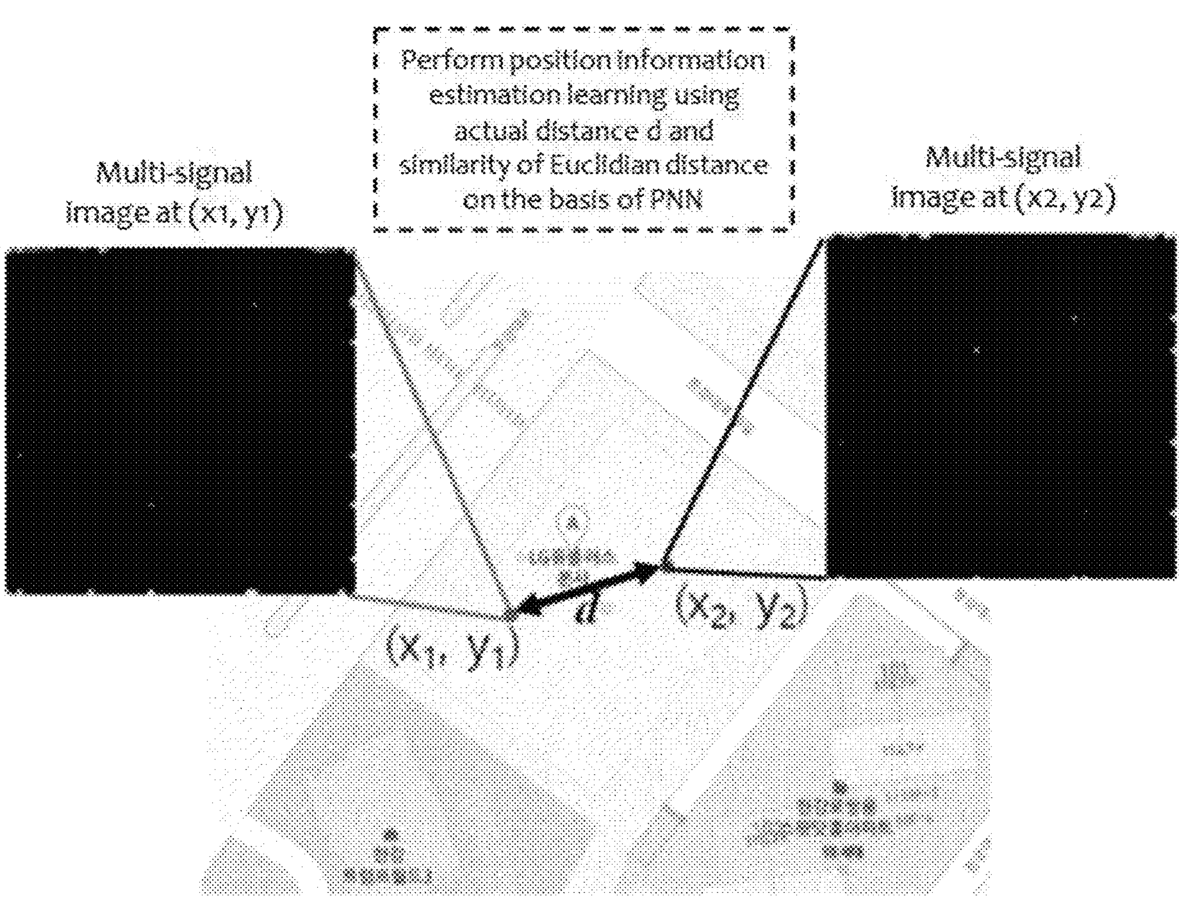
FIGS. 6 to 9 are views for explaining in more detail a general technical algorithm for constructing a positioning neural network based on sensor map images according to an embodiment of the present invention.

Referring to FIG. 6, an embodiment of the present invention may use an actual Euclidean distance calculation process for constructing a positioning neural network, and the positioning neural network may be constructed by learning similarity between two constellation images, and accordingly, similarity between the two constellations may be converted into distance information and used for learning position information.

More specifically, it may be said that the positioning neural network learning unit 130 learns similarity between sensor map image pairs to construct a positioning neural network, and to this end, the positioning neural network learning unit 130 may process to extract a constellation image object as a feature object from each arbitrary sensor map image pair, label Euclidean distance information between two constellation image objects, and learn parameters of an association function between the pair and the label through a deep learning neural network database such as CNN or RNN.

Accordingly, when a first sensor map image corresponding to the multi-composite signal requested by the portable terminal 200 is received, the positioning neural network learned by the positioning neural network learning unit 130 may be used to extract a learning sensor map image identified that the Euclidean distance information to the first sensor map image is shortest and smaller than or equal to a threshold. In addition, since position information previously mapped in correspondence to the learning sensor map image may be output as positioning information of the positioning neural network, actual position information may be estimated.

Figure 7:
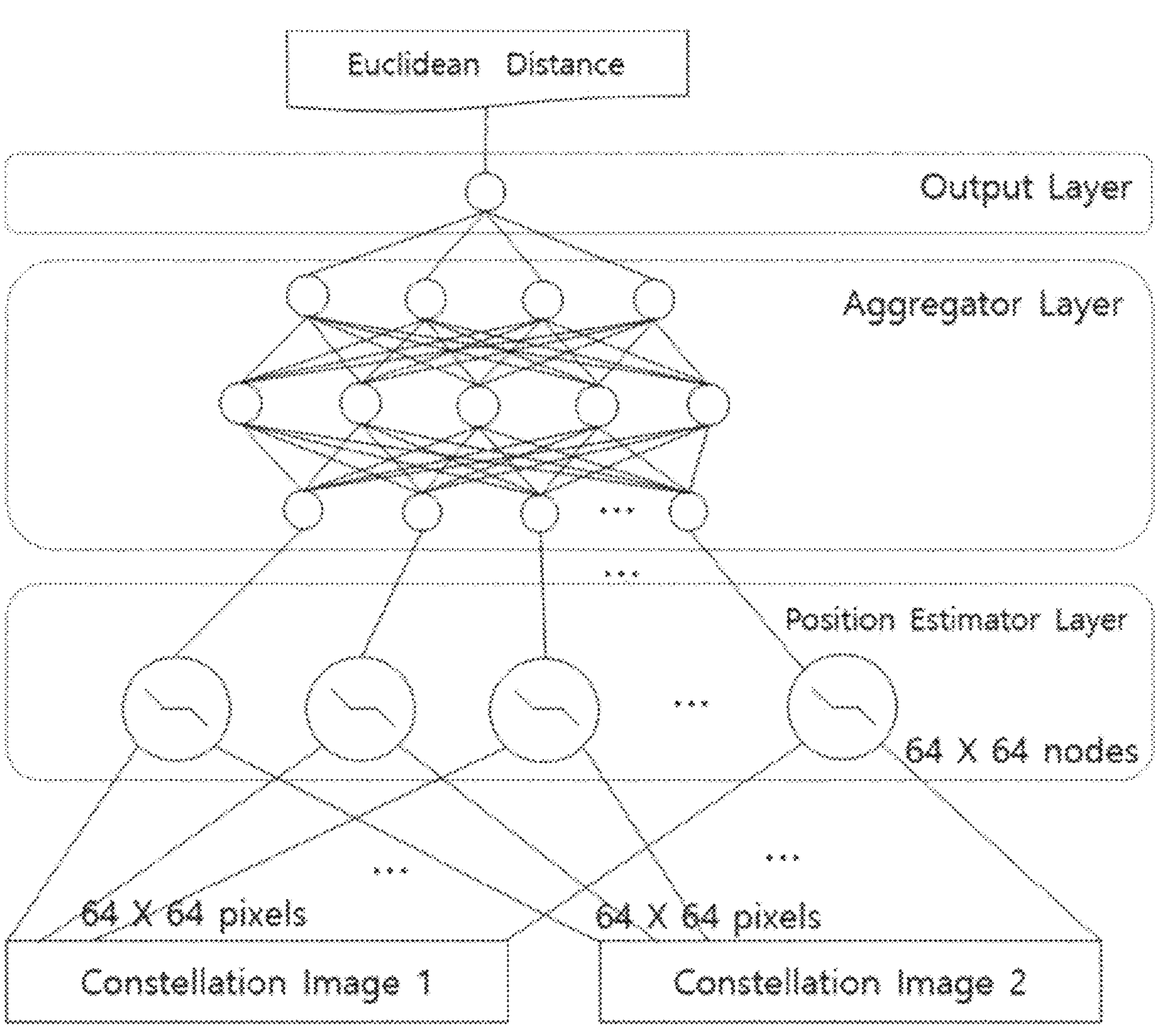

In addition, as shown in FIG. 7, the constellation image based on the sensor map image (constellation-type signal map image) may be processed using an activation function dedicated to indoor constellation positioning based on Euclidean distance information calculated between the constellation images, to be used for learning.

To this end, as shown in FIG. 7, the positioning neural network learning unit 130 according to an embodiment of the present invention may construct a deep learning-based Positioning Neural Network (PNN) model of the constellation image object, which multi-dimensionally learns the positioning estimation information using a multi-dimensional activation function for comparing similarity between the constellation image objects, and the positioning neural network model according to an embodiment of the present invention may be a perceptron neural network specialized for comparison of constellation images, and may be configured to have perceptron corresponding to all stars (image object pixels) of each image.

However, when an equal weight is set, since values changed by learning may not be derived through a simple comparison of perceptron from the viewpoint of a general artificial neural network algorithm, the positioning neural network according to an embodiment of the present invention may perform learning in a method of multi-dimensionally tuning the activation function itself of the perceptron.

More specifically, the constellation image may be an image connecting signal pixels mapped to the same position information, and the weights of the compared constellation images may be set to be equal to perform an accelerated learning process by optimizing parameters tuning and comparing process of the activation function of the perceptron based on the weights. In addition, performance can be optimized as an activation function dedicated to positioning is used as a three-dimensional or multi-dimensional function corresponding to two inputs.

Figure 8:
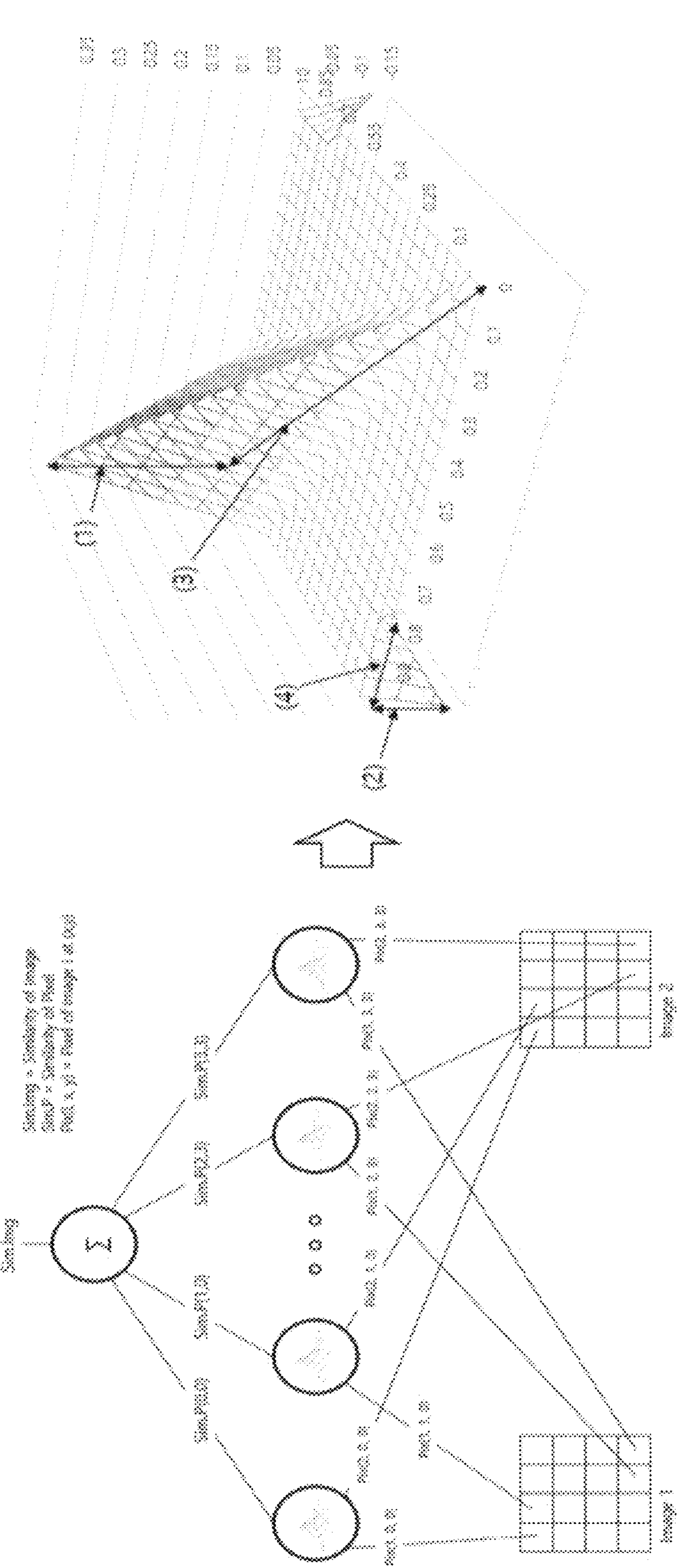

In addition, FIG. 8 is a view showing an example of a method of constructing a multi-dimensional activation function according to an embodiment of the present invention, and the positioning neural network according to an embodiment of the present invention may be set to estimate information that cannot be positioned using a conventional standardized activation function, i.e., an accurate position, using an output according to applying a different multi-dimensional function to each function.

More specifically, referring to FIG. 8, a positional neural network (PNN) according to an embodiment of the present invention reflecting the features of a sensor map image based on a multi-composite signal may be implemented using a backpropagation method based on an activation function.

In addition, the PNN-based positioning neural network according to an embodiment of the present invention may be constructed using a three-dimensional transfer function having an output that decreases according to the magnitude and difference of two input values, and as both the connection strength and weight of connections constituting the neural network itself are fixed to the same value, and parameters for tuning the transfer function itself may vary, accuracy of estimating the positioning neural network can be improved by learning.

Generally, fixed nonlinear functions such as known Sigmoid, reLu, and the like are used as the transfer function of the artificial neural network, and learning may be implemented by controlling the connection weight of each neural node through learning. However, in the learning process of PNN according to an embodiment of the present invention, the three-dimensional transfer function is defined by four types of parameters (cases marked as 1, 2, 3 or 4) while all connection weights of each node are fixed, and a backpropagation function may be used for tunning the transfer function to the learning result.

For example, as each of the four types of parameters may be a variable that determines the shape of a function and may be set in various ways according to the positioning environment to be suitable for being applied to indoor and outdoor positioning, preferably, an activation function based on a specially designed four-dimensional variable such as (1) the maximum value of a positive output, (2) the maximum value of a negative output, (3) the slope of the positive output, and (4) the slope of the negative output may be used.

Accordingly, the PNN-based positioning neural network according to an embodiment of the present invention learns equally all other variables as the same pixels and only the four types of parameters are considered in the learning, the number of the parameters is very small and the range of input and output can be defined clearly.

For example, the positioning neural network learning unit 130 may perform a gradient descent algorithm or the like for all ranges of input and output for a four-dimensional space for learning of the positioning neural network, and a loss function may be set to use the distance information of an image that is determined as the most similar image, and as learning may be performed by finding a position where the total sum of the loss function is smallest while tuning the four type of parameters, the learning process according to an embodiment of the present invention may derive a tuning value of a model applying an appropriate algorithm capable of estimating position information based on a sensor map image at a considerable accuracy.

Figure 9:
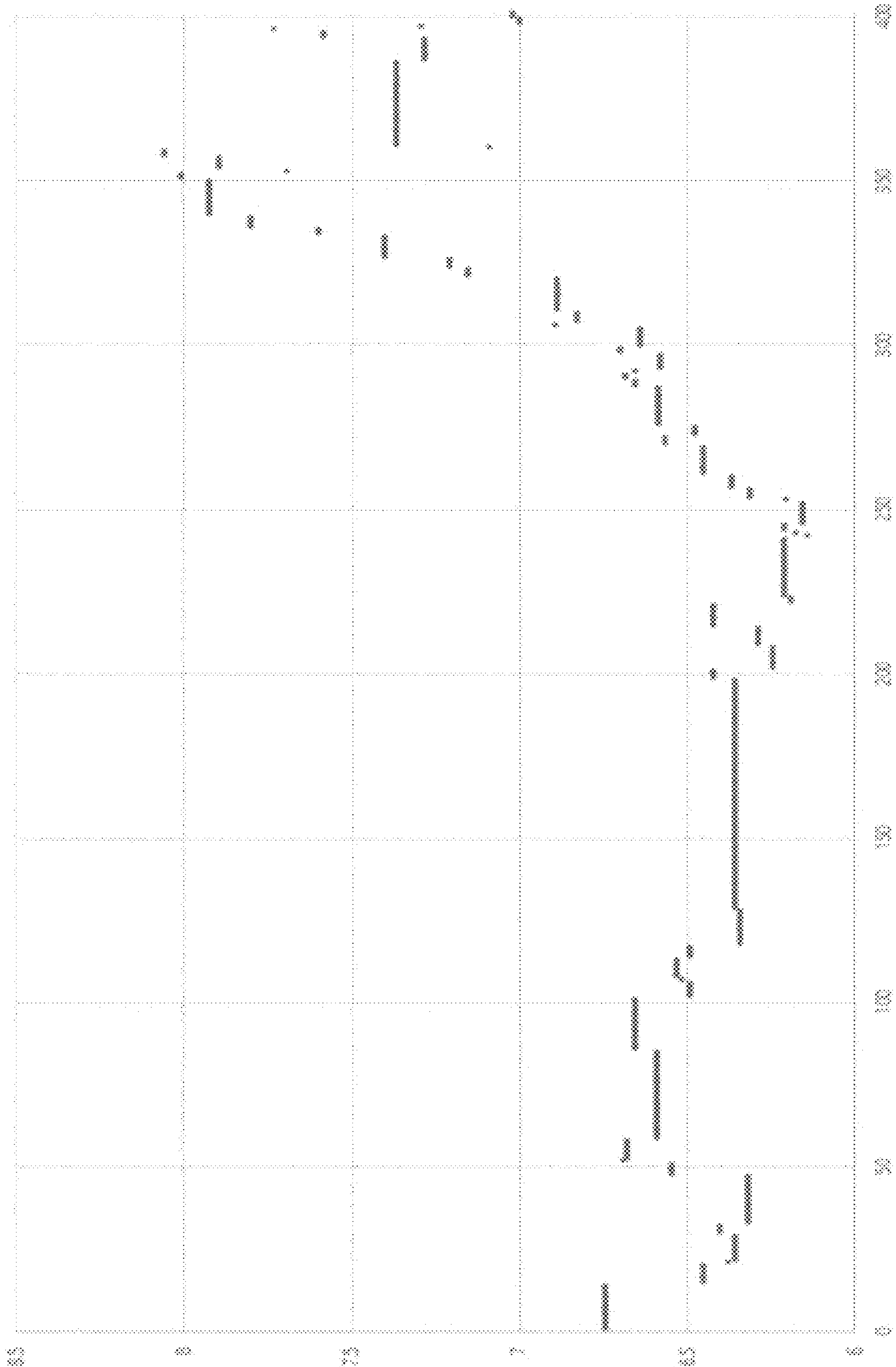

On the other hand, referring to FIG. 9, FIG. 9 shows change of the cost function according to change of parameters, and the positioning neural network learning unit 130 may use a cost minimization algorithm to implement a learning model, and the cost function may be set as actual distance information between an input sensor map image and a sensor map image selected as the closest one. As a result, the learned positioning neural network may analyze similarity and select and output the closest image, in correspondence to all sensor map images except the first sensor map image selected in correspondence to the input sensor map image.

However, although learning may be continued to derive a cost of a smaller distance through the learning, it may not be easy to estimate or optimize the change since the cost function is configured as definition of variables rather than a mathematical formula. In addition, as a result, a comprehensive optimization for a five-dimensional variable that combines the four types of parameters is needed.

For example, as shown in FIG. 9, referring to change of cost function according to change of slope of (3) positive output among the four types of parameters described above, it can be seen that an optimization method that does not use the slope is efficient. Accordingly, optimization of the cost function according to an embodiment of the present invention is an optimization method in a state where the number of dimensions is not high while the domain is clear, and it may be preferable to use an Exhaustive Search or Simulated Annealing algorithm.

Therefore, since the positioning neural network according to an embodiment of the present invention allows to construct an arbitrary transfer function suitable for the structural characteristics and signal propagation characteristics according to each building or surrounding environment, the type and number of parameters suitable for each indoor or outdoor environment may be set differently so that an appropriate multi-dimensional function may be defined according to an actual environment.

Figure 11:
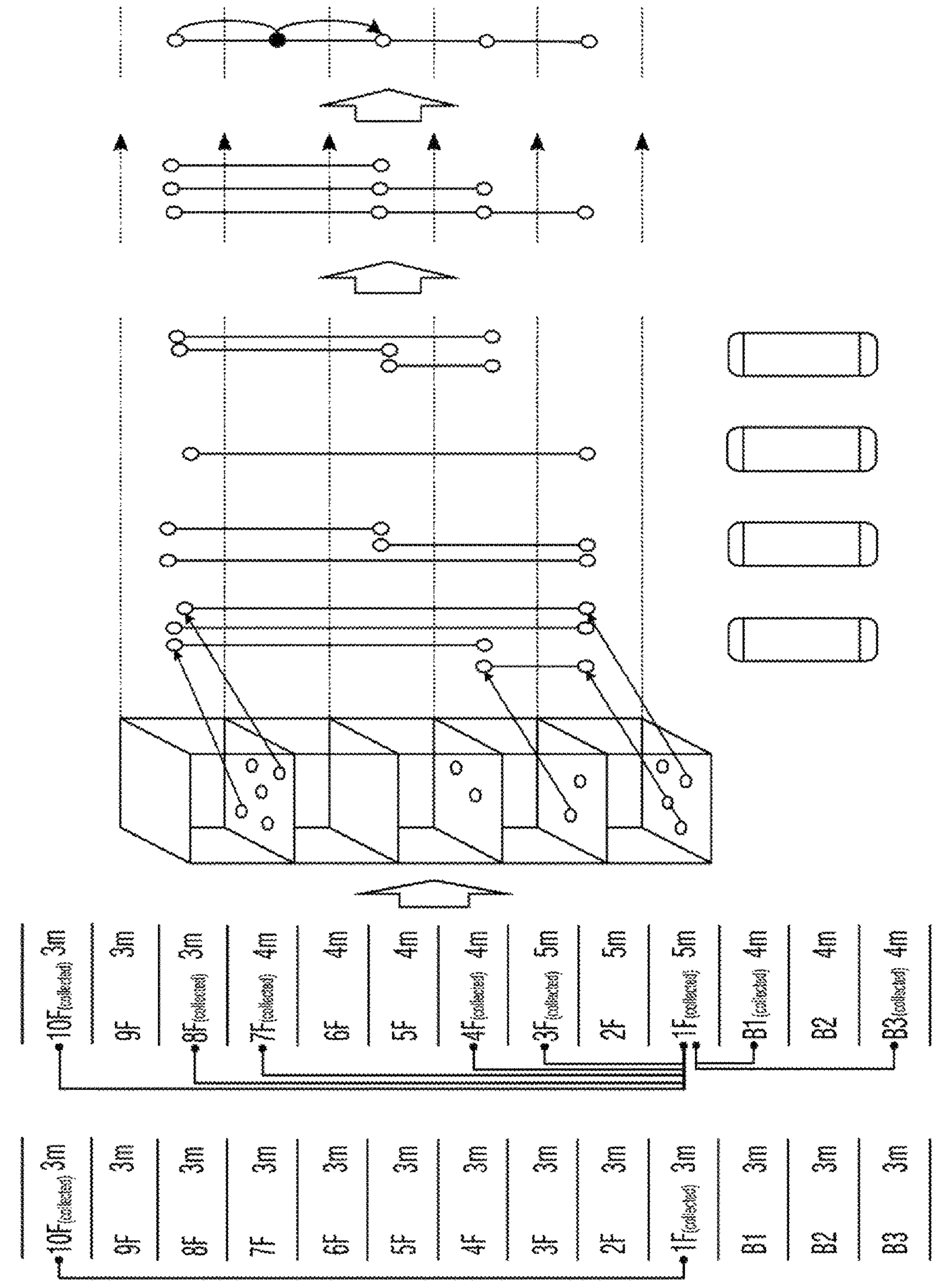
FIGS. 11 and 12 are views showing a process of constructing a relative pressure map model according to an embodiment of the present invention.
Figure 12:
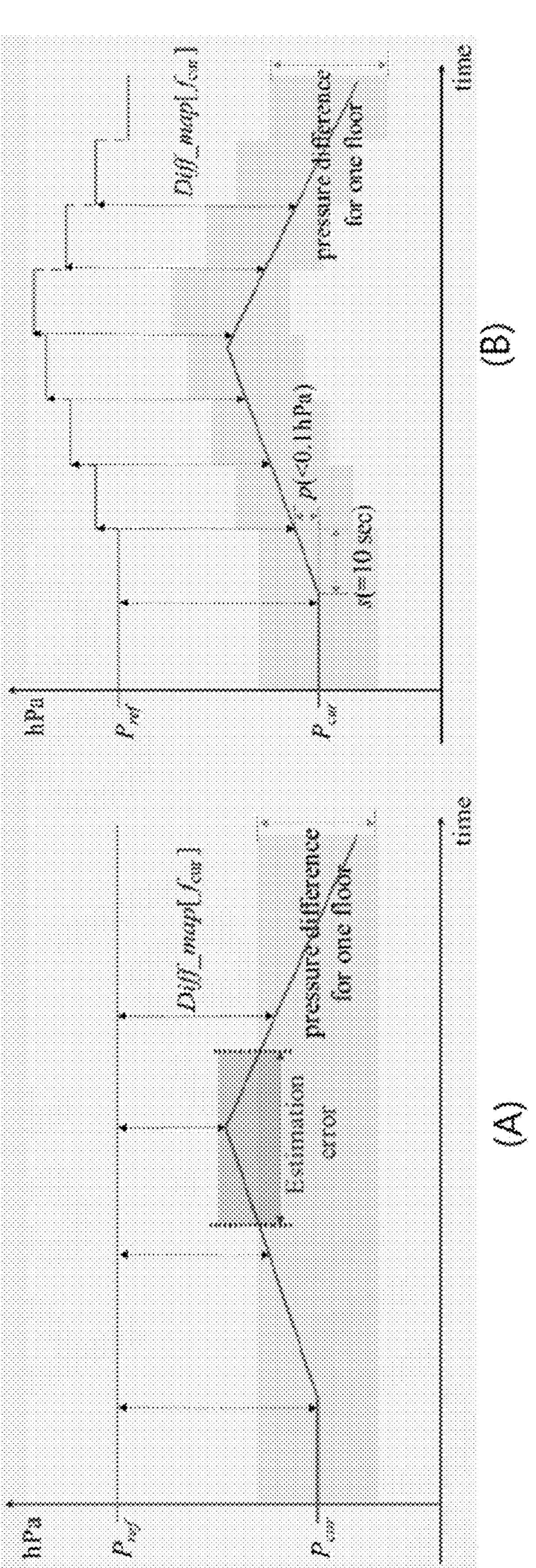

FIG. 10 is a block diagram showing in more detail a relative pressure map model-based floor number positioning unit according to an embodiment of the present invention, and FIGS. 11 and 12 are views showing a process of constructing a relative pressure map model according to an embodiment of the present invention.

As shown in FIG. 10, the relative pressure map model-based floor number positioning unit 150 may include a relative pressure map generator 151, a floor number estimator 153, and a reference floor pressure optimizer 155.

First, the relative pressure map generator 151 generates a relative pressure map on the basis of a relative pressure pair.

Referring to FIG. 11, since pressure is measured as a pair of two floors when a relative pressure map is constructed, a floor number of high accuracy can be estimated by collecting only a pressure pair of minimum cost. Accordingly, a relative pressure map can be constructed with a minimum cost, and accuracy of vertical measurement by the relative pressure map can be increased up to 100% according to a pair aggregation algorithm.

Then, referring to FIG. 10 again, the floor number estimator 153 may extract the pressure signal of the portable terminal 200 and entry floor information based on the sensor map image of the portable terminal 200, and construct a relative pressure map positioning model for estimating the current floor number by applying the extracted entry floor information to the relative pressure map.

Here, the floor number estimator 153 may estimate the current floor number information by applying a formula for estimating the current floor number curr_floor using a reference floor pressure variable optimized by the reference floor pressure optimizer and the entry floor information extracted from the sensor map image.

The reference floor pressure optimizer 155 may optimally update the reference floor pressure information of the relative pressure map using the calculated current floor number information (entry floor information) and the pressure signal acquired from the barometer of the portable terminal 200.

In addition, referring to FIG. 12, the reference floor pressure optimizer may perform error correction on the relative pressure map in real time using weather information received from the outside.

More specifically, the reference floor pressure optimizer according to an embodiment of the present invention may optimize the relative pressure map using an expectation maximization (EM) algorithm for correcting real-time change of pressure.

The reference floor pressure optimizer may guarantee sustainable vertical accuracy in real time by updating the actual pressure of the reference floor (1st floor) using the current floor number information and pressure information and correcting errors generated due to change of weather.

The methods according to the present invention described above may be manufactured as a program to be executed on a computer and stored in a computer-readable recording medium, and examples of the computer-readable recording medium include ROM, RAM, CD-ROM, magnetic tapes, floppy disks, optical data storage devices and the like.

The computer-readable recording medium may be distributed in computer systems connected through a network, so that computer-readable codes may be stored and executed in a distributed manner. In addition, functional programs, codes, and code segments for implementing the method may be easily inferred by the programmers in the art to which the present invention belongs.

In addition, although preferred embodiments of the present invention have been illustrated and described above, the present invention is not limited to the specific embodiments described above, and various modified embodiments can be made by those skilled in the art without departing from the gist of the invention claimed in the claims, and in addition, these modified embodiments should not be individually understood from the spirit or perspective of the present invention.

The invention claimed is:

1. A method of operating a positioning system, the method comprising the step of:

constructing a positioning model based on artificial intelligence positioning neural network learning on the basis of each sensor map image converted from multi-signal environment data collected by a plurality of portable terminals and position information corresponding to the plurality of portable terminals, wherein the positioning model based on artificial intelligence positioning neural network learning is trained to output first position estimation information corresponding to a first portable terminal when a first sensor map image corresponding to the first portable terminal for which a positioning-based service is requested is input, wherein the sensor map image includes one or more image objects, of which at least one among a color, a size, and brightness is determined differently according to at least one among a type, the number, and intensity of multi-composite signal data preprocessed from the multi-signal environment data.

2. The method according to claim 1, wherein the multi-composite signal data includes data obtained by preprocessing the multi-signal environment data collected from the portable terminal into hash-based coordinate data.

3. The method according to claim 1, wherein the sensor map image includes an image frame, in which a signal type of the multi-signal environment data is expressed as a color of a dot that is an image object, the number of the multi-signal environment data of each type is expressed as a size of a dot, and strength of a signal is expressed as color intensity or brightness of a dot.

4. The method according to claim 1, wherein the positioning model based on artificial intelligence positioning neural network learning is configured according to a process of learning similarity of image between the sensor map images, and the similarity is calculated according to a Euclidian distance between one or more feature image objects acquired from a sensor map image pair.

5. The method according to claim 4, wherein the feature image object is a feature object of the sensor map image, and includes a constellation image object having a size or an intensity of a predetermined level or higher in an image frame.

6. The method according to claim 4, wherein the positioning model based on artificial intelligence positioning neural network learning is constructed using a perceptron process that extracts feature information of the sensor map image to calculate distance information between images using constellation image objects of each sensor map image, and the perceptron process includes a neural network learning process assigned with a multi-dimensional activation function in which a predetermined number of parameters are tuned by a learning process.

7. The method according to claim 6, wherein the neural network learning process includes a tuning process of setting distance information between sensor map images as a cost and optimizing the parameters of the multi-dimensional activation function in a direction minimizing the cost.

8. The method according to claim 6, wherein the parameters tuned in the multi-dimensional activation function includes at least one among a maximum value of a positive output, a maximum value of a negative output, a slope of a positive output, and a slope of a negative output.

9. The method according to claim 8, wherein the type and number of the tuned parameters are determined differently according to an indoor or outdoor positioning environment.

10. The method according to claim 1, further comprising the step of constructing a relative pressure map positioning model for positioning current floor number information of the first portable terminal using a pressure signal acquired in correspondence to a sensor map image of the first portable terminal, wherein the step of constructing a relative pressure map positioning model includes the steps of:

generating a relative pressure map based on a relative pressure pair acquired from pressure signals collected from the plurality of portable terminals; and generating the relative pressure map positioning model for estimating current floor information when a positioning target pressure signal is input, by mapping entry floor information, which is collected from the plurality of portable terminals to be mapped to the pressure signal, to the relative pressure map.

11. The method according to claim 10, wherein the step of constructing a relative pressure map positioning model further includes the step of performing real-time error correction on the relative pressure map using current weather information acquired from outside.

12. A positioning system comprising:

a sensor map image collection unit for collecting each sensor map image converted from multi-signal environment data collected by a plurality of portable terminals; and a positioning neural network learning unit for constructing a positioning model based on artificial intelligence positioning neural network learning on the basis of position information corresponding to the plurality of portable terminals, wherein when a first sensor map image corresponding to a first portable terminal for which a positioning-based service is requested is input, the positioning model based on artificial intelligence positioning neural network learning is trained to output first position estimation information corresponding to the first portable terminal, wherein the sensor map image includes one or more image objects, of which at least one among a color, a size, and brightness is determined differently according to at least one among a type, the number, and intensity of multi-composite signal data preprocessed from the multi-signal environment data.

13. The system according to claim 12, wherein the multi-composite signal data includes data obtained by preprocessing the multi-signal environment data collected from the portable terminal into hash-based coordinate data.

14. The system according to claim 12, wherein the sensor map image includes an image frame, in which a signal type of the multi-signal environment data is expressed as a color of a dot that is an image object, the number of the multi-signal environment data of each type is expressed as a size of a dot, and strength of a signal is expressed as color intensity or brightness of a dot.

15. The system according to claim 12, wherein the positioning model based on artificial intelligence positioning neural network learning is configured according to a process of learning similarity of image between the sensor map images, and the similarity is calculated according to a Euclidian distance between one or more feature image objects acquired from a sensor map image pair.

16. The system according to claim 15, wherein the feature image object is a feature object of the sensor map image, and includes a constellation image object having a size or an intensity of a predetermined level or higher in an image frame, and the positioning model based on artificial intelligence positioning neural network learning is constructed using a perceptron process that extracts feature information of the sensor map image to calculate distance information between images using constellation image objects of each sensor map image, and the perceptron process includes a neural network learning process assigned with a multi-dimensional activation function in which a predetermined number of parameters are tuned by a learning process.

17. The system according to claim 16, wherein the neural network learning process includes a tuning process of setting distance information between sensor map images as a cost and optimizing the parameters of the multi-dimensional activation function in a direction minimizing the cost, and the parameters tuned in the multi-dimensional activation function includes at least one among a maximum value of a positive output, a maximum value of a negative output, a slope of a positive output, and a slope of a negative output, and the type and number of the tuned parameters are determined differently according to an indoor or outdoor positioning environment.

18. The system according to claim 12, further comprising a relative pressure map model-based floor number positioning unit for constructing a relative pressure map positioning model for positioning current floor number information of the first portable terminal using a pressure signal acquired in correspondence to a sensor map image of the first portable terminal, wherein the relative pressure map model-based floor number positioning unit includes:

a relative pressure map generator for generating a relative pressure map based on a relative pressure pair acquired from pressure signals collected from the plurality of portable terminals; and a floor number estimator for generating the relative pressure map positioning model for estimating current floor information when a positioning target pressure signal is input, by mapping entry floor information, which is collected from the plurality of portable terminals to be mapped to the pressure signal, to the relative pressure map.

* * * * *